United States Patent [19]

Riley et al.

[11] 4,365,409
[45] Dec. 28, 1982

[54] METHOD AND APPARATUS FOR FILLING SODIUM INTO SODIUM SULPHUR CELLS

[75] Inventors: David J. Riley, Chester; Gerald McGreavy, Bolton, both of England

[73] Assignee: Chloride Silent Power Limited, London, England

[21] Appl. No.: 193,058

[22] Filed: Oct. 2, 1980

[30] Foreign Application Priority Data

Oct. 15, 1979 [GB] United Kingdom ............... 7935712

[51] Int. Cl.³ .................................................. H01M 2/36
[52] U.S. Cl. ................................ 29/623.2; 29/623.1; 29/730
[58] Field of Search ............... 29/623.1, 623.2, 730, 29/731; 429/52, 102, 104, 172, 103; 141/311 R

[56] References Cited

U.S. PATENT DOCUMENTS 4,006,281  2/1977  Markin et al. ............... 429/104 X
4,287,664  9/1981  Chatterji et al. ............... 29/623.2

Primary Examiner—Francis S. Husar
Assistant Examiner—Jonathan L. Scherer
Attorney, Agent, or Firm—Beveridge, DeGrandi & Kline

[57] ABSTRACT

For filling sodium into the sodium reservoir of a sodium-sulphur cell, the reservoir is closed except for an open-ended metal filling tube. In a filling machine, the cell is heated to a temperature such that the sodium will remain liquid, the tube is temporarily sealed around a sodium outlet of the filling machine by an inflatable seal, the reservoir is evacuated of air, flushed with an inert gas and then evacuated for vacuum filling with a metered quantity of sodium through a sodium feed tube within said outlet and extending downwardly into the filling tube. The sodium is pressurized using an inert gas to force the sodium into the cell, the gas is evacuated and the filling tube on the cell sealed by pinching and welding.

16 Claims, 4 Drawing Figures

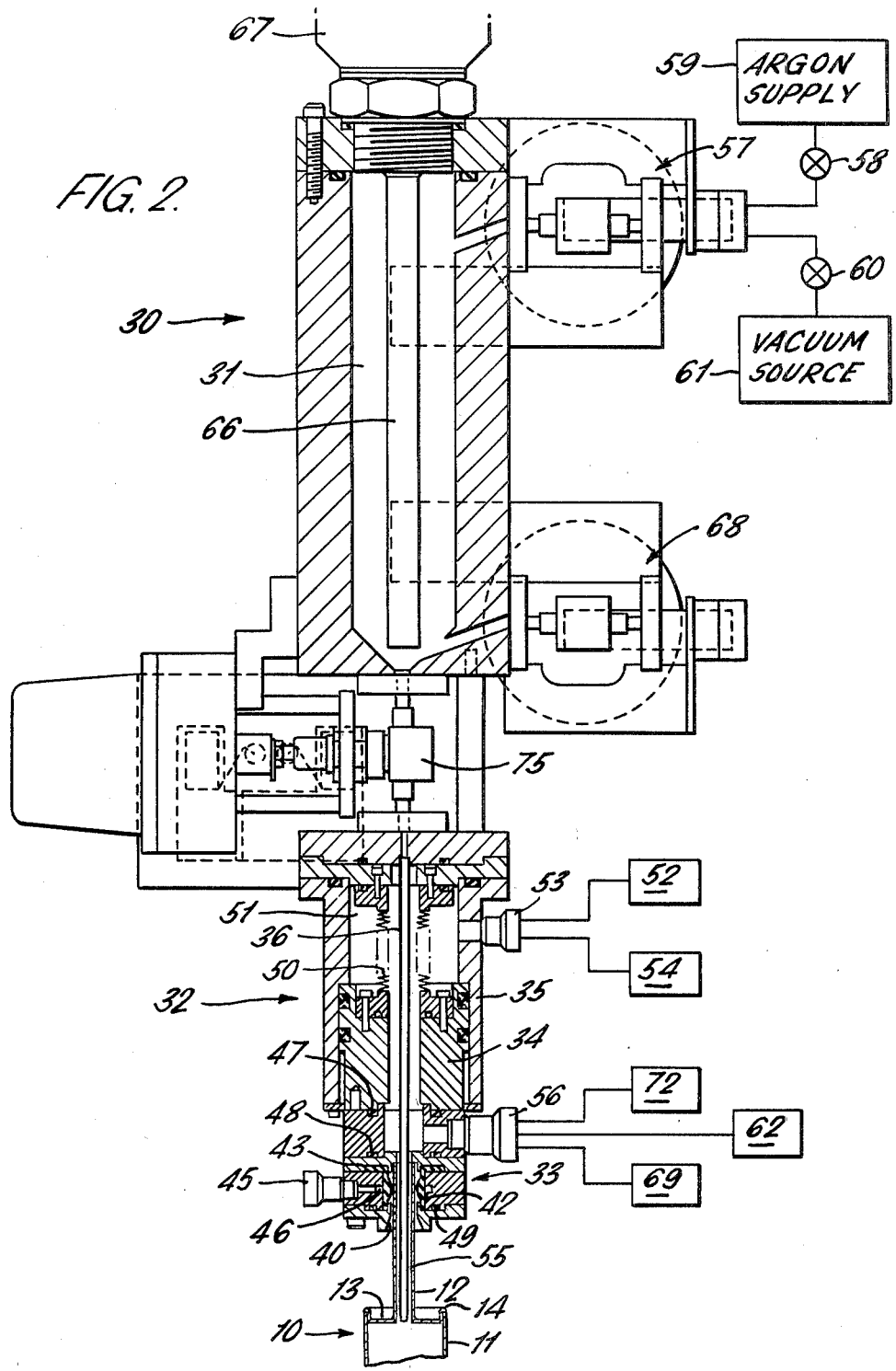

METHOD AND APPARATUS FOR FILLING SODIUM INTO SODIUM SULPHUR CELLS

BACKGROUND OF THE INVENTION

1. Field of the Invention

This invention relates to the manufacture of sodium sulphur cells and is concerned more particularly with the filling of the sodium reservoir of such a cell with liquid sodium.

2. Prior Art

Sodium sulphur cells for experimental purposes have been made in small quantities and it is readily possible to fill the sodium reservoir by carrying out the filling operation in a closed chamber filled with a suitable inert gas, the cell being sealed, before removal from the chamber. Such a technique, whilst convenient for making a few cells at a time, does not lend itself to continuous quantity production of cells. The chamber has to be opened after sealing of the cell and then has to be purged of any air before the next batch of cells can be filled.

For this reason, a number of proposals have been made (see for example U.S. Pat. Nos. 4,102,042; 4,167,807; 4,189,530 and 4,204,035) for solidifying the sodium before it is loaded into a sodium reservoir for the cell. The use of solid sodium however puts constraints on the shaping of the cell if the sodium has to be put directly into the cell or requires the provision of a separate sodium reservoir. In either case, complete filling of all the available anode space is not generally possible.

BRIEF SUMMARY OF THE INVENTION

It is an object of the present invention to provide an improved method for the filling of the sodium compartment of sodium sulphur cells, permitting a succession of cells to be filled and sealed in a continuous sequence.

According to one aspect of the present invention, a method of filling sodium into the sodium reservoir of a sodium sulphur cell comprises the steps of closing the sodium reservoir except for an open-ended metal filling tube sealed into the reservoir and extending outwardly therefrom, heating the cell to a temperature such that the sodium will remain liquid, temporarily sealing an outlet of a filling machine round the outer surface of the filler tube with the cell arranged so that the filler tube extends upwardly from the reservoir, evacuating the reservoir of air, metering a predetermined quantity of liquid sodium through said outlet into the sodium reservoir and then pinching and sealing the filler tube.

It will be seen that this technique enables a succession of sodium sulphur cells to be filled with liquid sodium without requiring the cells to be put into and taken out of any chamber free of air.

The temporary seal may conveniently be effected by use of an inflatable or gas pressurised elastomeric sealing element which is pressed around the external surface of the filling tube, for example using compressed air. The sodium reservoir is evacuated before filling with sodium. To ensure removal of all oxygen, the reservoir may firstly be evacuated, for example down to a pressure of about 5 torr, then flushed with a suitable inert gas, e.g. argon or nitrogen, followed by subsequent evacuation to a suitable low pressure for vacuum filling of the cell, for example down to a pressure of $1 \times 10^{-2}$ torr.

After introducing the sodium, it may be desirable to increase the pressure, using an inert gas such as argon up to a pressure typically of 800 torr and then re-evacuating the cell in order to ensure that all the sodium has been forced into the reservoir.

The filling of the sodium may be effected under gravity. It is preferred that the sodium is introduced into the reservoir through a sodium feed tube extending downwardly through the aforementioned filler tube. This ensures that there is no splashing and that all the sodium is introduced into the reservoir.

The final sealing of the filler tube may be effected by pinching the tube between heated members or welding electrodes which effect welding of the walls of the filler tube after they have been forced into intimate contact.

With sodium sulphur cells containing solid electrolyte such as beta alumina, it is desirable to have a limited rate of change of temperature, for example not exceeding 10° C. per minute. It is convenient therefore to pass the tubes through heating means for example an oven, possibly having a plurality of successive heating sections, which may be at different temperatures, and thence to carry the heated tubes to the filler. The filled cells may be cooled down on a conveyor as they move away from the filling station; preferably the rate of cooling does not exceed 10° C. per minute for cells containing beta-alumina electrolyte.

According to another aspect of the present invention, apparatus for filling sodium into a sodium reservoir of a sodium sulphur cell having a metal filling tube extending outwardly from the reservoir comprises means for heating the cells, a filling device including means for effecting a temporary seal between the outlet of the filling device around the filler tube, said filling device incorporating means for evacuating air from the sodium reservoir of the cell and for consequently feeding into the cell through the filler tube a predetermined quantity of sodium and means for pinching and sealing the filler tube.

As explained above, the temporary seal around the outside of the filler tube is conveniently effected using an inflatable or gas-pressurisable elastomeric element around the filler tube.

Sodium is preferably introduced into the sodium reservoir through a feed tube passing downwardly through the aforementioned filler tube. In this case, the feed tube may have to be partially withdrawn from the filler tube before pinching and sealing the filler tube. For this purpose, it is convenient to lower the cell downwardly with respect to the feed tube. Since the filling machine has to be sealed to the outer surface of the filler tube, when the cell is lowered, conveniently the sealing assembly and the filler machine is movably mounted with respect to the feed tube so that it can be raised and lowered. This sealing assembly conveniently includes outlet connections for evacuating the sodium reservoir, this evacuation being effected through an annular space between the feed tube and the filler tube. Provision is made for feeding in the sodium through the feed tube, conveniently using gravity, the sodium being pressurised with an inert gas, for example argon.

The invention furthermore includes within its scope a sodium sulphur cell filled with sodium by the above-described method.

BRIEF DESCRIPTION OF THE DRAWINGS

FIG. 2 is a sectional elevation of the filler mechanism and the apparatus of FIG. 1, showing part of a cell in position for filling;

DESCRIPTION OF THE PREFERRED EMBODIMENT

In FIG. 2 there is shown part of a sodium sulphur cell 10 comprising a cylindrical metal casing 11 with a dished end cap 13 inserted into the end of the casing and welded thereto around the periphery of the cap at 14. The cap has a metal filler tube 12 extending outwardly from the centre of the cap coaxial with the cell, the filler tube being integral with or welded into the cap. For the present purposes, it is not necessary to describe further the construction of the sodium sulphur cell beyond saying that the region immediately below the cap within the casing forms part of a sodium reservoir. This sodium reservoir extends downwardly into a capillary region adjacent one surface of a polycrystalline beta alumina ceramic electrolyte tube.

Figure 1:
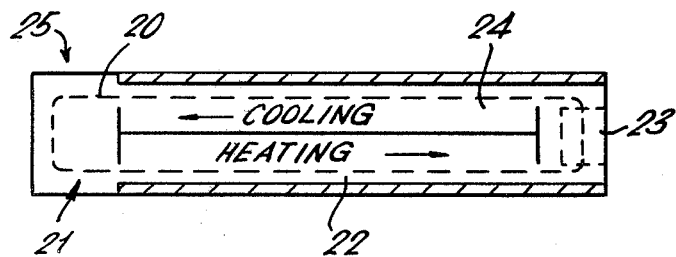
FIG. 1 is a diagrammatic plan view of one construction of apparatus for the filling of sodium sulphur cells with sodium.

To fill the cell with sodium, it is necessary to maintain the cell above the melting point of sodium (97.5° C.) and it is desirable that the cell should be at a known uniform temperature which is well above the melting point, for example 150° C. To ensure uniformity of temperature and a heating rate not greater than 10° C. per minute, the cells, after loading onto a conveyor 20 (FIG. 1) at a loading station 21 are traversed through an oven 22, conveniently a multi-stage oven with successive regions at different temperatures. Within the oven they pass to a filling station 23. After filling they are traversed back on the conveyor through a cooling zone 24 which allows the cells to cool at a rate not exceeding 10° C. per minute. From this cooling zone the cells are carried to an unloading station 25. The cells are conveyed in an upright position with the previously described filler tube at the upper end of the cell.

The present invention is concerned more particularly with the filling of the cells with sodium at the filling station. The filling station is illustrated in further detail in FIG. 2. This filling apparatus comprises an upper part 30 including a chamber 31 forming a metering chamber for metering the sodium, and a lower part 32 including a movable seal unit 33 carried on a piston 34 movable in a cylinder 35. This lower part 32, including the piston and cylinder, is of annular form surrounding a feed tube 36 sealed into the lower outlet end of the upper part 30.

When a cell arrives at the filling station, the cell is lifted vertically so that the upper end of the filler tube 13 enters into a V-shaped guide 40 at the lower end of the seal unit 33 carried on the aforementioned piston 34. This seal unit 33 includes an elastomeric sealing element 42 of annular form having an integral flange 43 by which it is clamped into the unit 33. An inlet tube 45 permits the introduction of compressed air into an annular region 46 around the seal element 42 so that this element is pressed tightly into sealing engagement with the outer surface of the filler tube 12 on the cell. In this particular embodiment, air pressure at 30 psi is used for inflating the seal and provision is made for applying a vacuum, typically 100 torr, for releasing the seal when required after the end of the filling operation.

The seal unit 33 is carried on the lower end of the aforementioned piston 34 which, as previously explained, is of annular form. O-ring seals 47, 48, 49 ensure a vacuum-tight assembly. The piston 34 is carried on a bellows 50 which extends around the feed tube 36 so defining an annular region 51 within the cylinder to which air pressure from a source 52 may be applied through an inlet 53 for forcing the piston 34 downwardly. Alternatively vacuum from vacuum source 54 may be applied through this inlet 53 for raising the piston. When loading a cell for filling, the piston 34 is in its uppermost position as shown in FIG. 2. In this position the feed tube 36 extends downwardly through the filler tube 12 to have an outlet at the top of the sodium reservoir inside the cell 10.

It will be noted that the feed tube 36 is of smaller diameter than the filler tube 12 leaving an annular region 55 between the feed tube and filler tube. Before putting sodium into the cell, it is necessary to remove all the air from the sodium reservoir in the cell. This is effected firstly by applying a vacuum, in this particular embodiment of 5 torr, to an inlet 56 leading to the aforementioned annular region 55, then flushing with argon and re-evacuating.

In the operation of the filling machine however before the evacuation of the sodium reservoir in the cell, the first step is to charge the sodium chamber 31 of the filling machine with the required quantity of sodium. The raising of the cell to insert the filler tube 12 in the bottom of the filling machine actuates a limit switch (not shown) which closes an inlet valve 58 connecting the chamber 31 via a further valve 57 to a source 59 of argon under pressure, typically 800 torr and then opens a valve 60 to connect the chamber 31 to a vacuum source 61 which evacuates this chamber to typically 2 torr. At this point in the cycle, before putting the sodium into the chamber 31, the sodium reservoir of the cell to be filled and the annular space 55 are evacuated by connecting the aforementioned inlet 56 to a vacuum source 62, typically at 5 torr to evacuate the cell. The next step in the sequence, initiated by pressure switches sensing the evacuation of the sodium reservoir and seal chamber, is to admit sodium into the measuring chamber 31 via a sodium inlet valve 68. The sodium is at 150° C. The chamber 31 contains a level sensor (e.g. a capacitance level gauge) on a probe 66 connected to measuring unit 67 which is adjustable to enable it to be set to the required amount of sodium for charging the cell. Operation of the level sensor closes the valve 68 in the sodium inlet. The cell is now flushed via the inlet 56 with argon gas at a pressure of 800 torr from an argon supply 69. The cell and filling head are now evacuated down to a pressure of $10^{-2}$ torr via the inlet 56 by connection to a vacuum source 72. After closing off the vacuum source 72, the valve 75 is then opened to connect the measuring chamber 31 to the lower part 32 of the filling machine and to allow the sodium in the chamber 31 to flow into the cell under gravity. Then valves 57 and 58 are opened so that argon pressure is applied and the sodium is forced down into the sodium reservoir of the cell. After closing of valve 75, the cell is then connected to the vacuum source 62 to reduce the pressure above the sodium to 5 torr.

Figure 3:
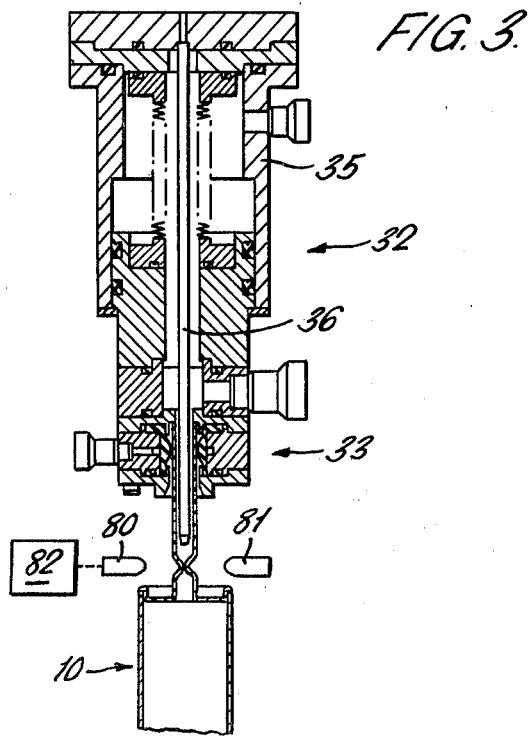
FIG. 3 is a diagram illustrating part of the filler mechanism and the cell in the position for pinching and sealing.
Figure 4:
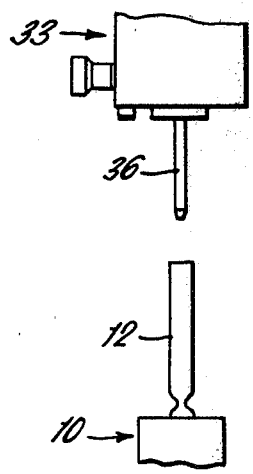
FIG. 4 is a further diagram illustrating the unloading position.

The cell is now filled and the next stage in the operation is to seal the cell. The first step in sealing the cell is to lower it from the position shown in FIG. 2 to the position shown in FIG. 3, this lowering being effected by applying compressed air through inlet 53 to the annular face of the piston 34 so that the piston together with the seal unit 33 and cell are lowered thereby partially withdrawing the feed tube (which remains stationary) from the filler tube. This is clearly seen in FIG. 3 where the feed tube 36 is now above the level of the cap 13. The cell is sealed by means of a pinch and seal mechanism indicated diagrammatically by two blocks 80, 81, located on opposite sides of the filler tube together with operating means indicated diagrammatically at 82. These blocks, in this particular embodiment, constitute electrodes of a resistance welding machine. The initial movement of the blocks together effects crimping of the tube. After the mechanical crimping, the welding is effected. This welding gives a helium-tight seal to the cell. After the welding has been effected, the welding electrodes are moved away from the cell. Argon is then admitted through inlet 56 to fill the sealing head with argon under pressure. The seal 42 is then released by applying vacuum to inlet 45 and the cell is thus released. The piston 34 is then raised by applying vacuum to inlet 52 and the cell is lowered a short distance as shown in FIG. 4 so that the filling tube is now clear of the feed tube. The cell can then be moved on the conveyor system to pass through the oven 24 which it cools at a slow rate before reaching the unloading station 25.

The conveyor conveniently is operated pneumatically and is moved in steps, each step giving sufficient time for a cell to be filled at the filling station 23. It will be seen therefore that this apparatus permits of continuous feeding of cells to and from the filling station where the cells are filled in sequence and sealed.

We claim:

1. A method of filling sodium into the sodium reservoir of a sodium sulphur cell comprising the steps of closing the sodium reservoir except for an open-ended metal filler tube sealed into the reservoir and extending outwardly therefrom, heating the cell to a temperature such that sodium will remain liquid, temporarily sealing an outlet of a filling machine round the outer surface of the filler tube with the cell arranged so that the filler tube extends upwardly from the reservoir, inserting a feed tube from said outlet into the filler tube to extend downwardly therein, evacuating the reservoir of air through the annular region between the feed tube and the filler tube, metering a predetermined quantity of liquid sodium through said outlet and said feed tube into the sodium reservoir and then pinching and sealing the filler tube.

2. A method as claimed in claim 1 wherein the temporary sealing is effected by pressing an inflatable or gas-pressurised elastomeric sealing element around the external surface of the filling tube.

3. A method as claimed in claim 1 wherein the evacuation of the sodium reservoir before filling with sodium is effected by firstly evacuating the reservoir, then flushing it with an inert gas, followed by subsequent evacuation to a low pressure for vacuum filling of the cell with sodium.

4. A method as claimed in claim 3 wherein, after introducing the sodium into the reservoir, the pressure is increased using an inert gas and the cell then re-evacuated to ensure that all the sodium has been forced into the reservoir.

5. A method as claimed in claim 1 wherein the filling of the sodium into the reservoir is effected under gravity.

6. A method as claimed in claim 1 wherein the filler tube is sealed by pinching the tube between heated members or welding electrodes which effect welding of the walls of the filler tube after they have been forced into intimate contact.

7. A method as claimed in claim 1 wherein the cell is heated by passing the cell through an oven arranged to effect heating at a rate not exceeding 10° C. per minute.

8. A method as claimed in claim 1 wherein the filled cells are cooled down, after filling, at a rate of cooling not exceeding 10° C. per minute.

9. Apparatus for filling sodium into a sodium reservoir of a sodium sulphur cell having a metal filler tube extending outwardly from the reservoir comprising means for heating the cells, a filling device including means for effecting a temporary seal between the outlet of the filling device and the filler tube, a feed tube connected to said outlet, means for inserting said feed tube down said filler tube to extend into said reservoir to provide an annular region between the feed tube and the filler tube, said filling device incorporating means for evacuating air from the sodium reservoir of the cell through said annular region between the feed tube and the filler tube and for subsequently feeding into the cell, through the feed tube, a predetermined quantity of sodium, and means for pinching and sealing the filler tube.

10. Apparatus as claimed in claim 9 wherein the means for heating the cells comprises an oven through which the cells are passed to the filling apparatus.

11. Apparatus as claimed in claim 10 wherein the means for effecting a temporary seal comprises an inflatable or gas-pressurisable elastomeric element around the filler tube.

12. Apparatus as claimed in claim 9 wherein the means for effecting a temporary seal is movably mounted so that it can be raised and lowered.

13. Apparatus as claimed in claim 9 wherein said means for effecting a temporary seal is arranged in a sub-assembly including outlet connections for evacuating the sodium reservoir.

14. Apparatus as claimed in claim 9 and having a metering chamber for metering said predetermined quantity of sodium.

15. Apparatus as claimed in claim 14 and having means for applying a pressurised inert gas to the sodium in said metering chamber to force it through a valve into the cell.

16. Apparatus as claimed in claim 9 wherein the means for pinching and sealing the filler tube comprises heated elements or welding electrodes movable towards one another to pinch the filler tube and effect welding to seal the tube.

* * * * *